Feb. 21, 1961 G. I. ROBERTS 2,972,449
MULTIPHASE DEVICE HAVING SYMMETRICAL RESISTANCE
Filed June 16, 1955 2 Sheets-Sheet 1
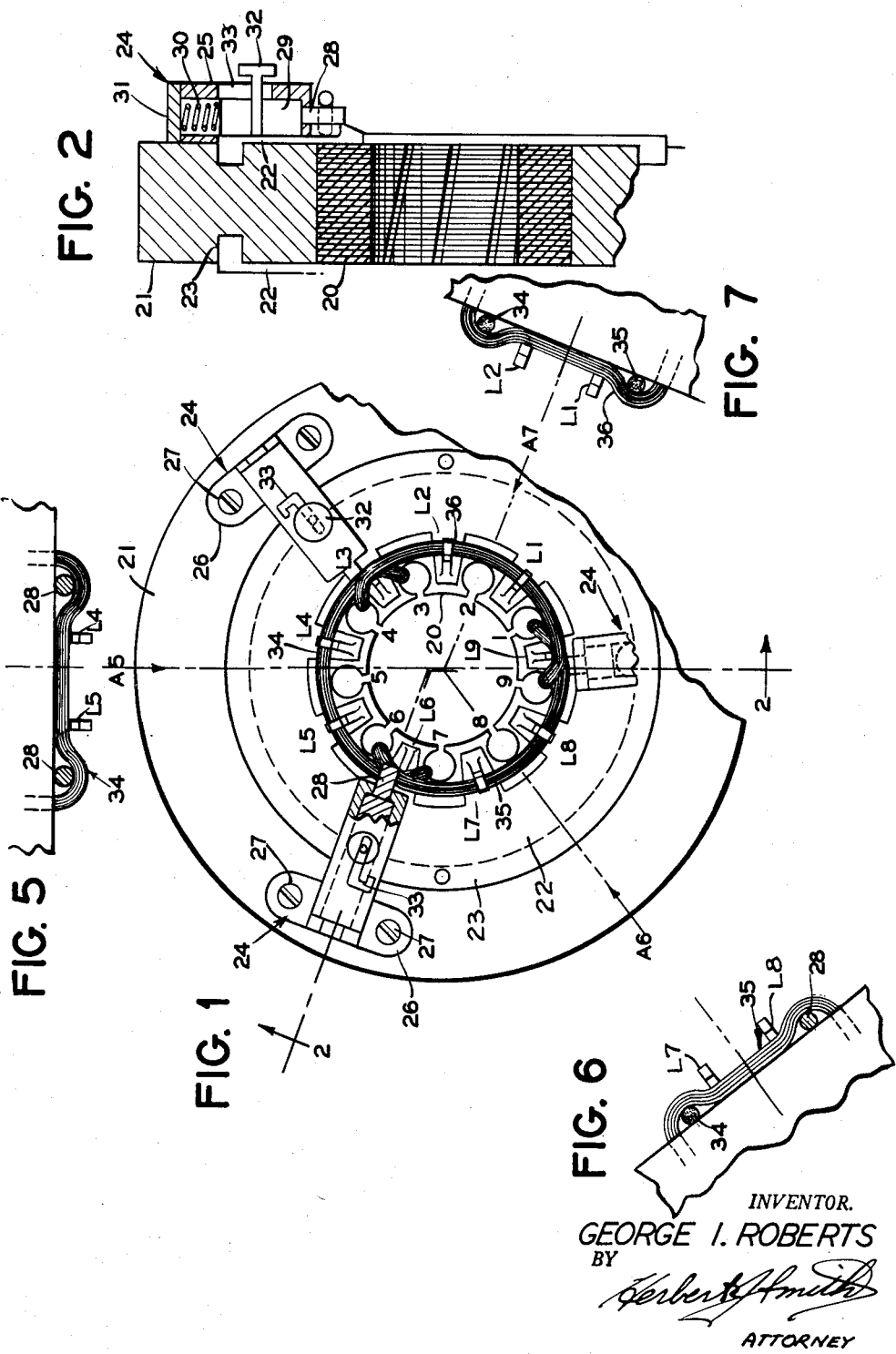
INVENTOR.
GEORGE I. ROBERTS
BY
ATTORNEY Feb. 21, 1961

G. I. ROBERTS 2,972,449

MULTIPHASE DEVICE HAVING SYMMETRICAL RESISTANCE

Filed June 16, 1955

INVENTOR.
GEORGE I. ROBERTS
BY
*[signature]*

ATTORNEY though not limited to the examples given herein, could be employed with any device of this general nature.

United States Patent Office 2,972,449
Patented Feb. 21, 1961

2,972,449
MULTIPHASE DEVICE HAVING SYMMETRICAL RESISTANCE

George I. Roberts, Maywood, N.J., assignor to The Bendix Corporation, a corporation of Delaware Filed June 16, 1955, Ser. No. 515,929

4 Claims. (Cl. 242—1.1)

This invention relates to the art of coil winding and more particularly to the means for obtaining symmetrical direct current resistance in multiphase devices such as a synchro, motor, solenoid, magnetic amplifier and the like.

The invention shows a means for forming the end turns of an inductive device having multiple similar type coils wherein the direct current resistance of said coils is electrically balanced by the controlled length of respective coil conductors due to conformation of the coil end turns.

Instrumentation, particularly in the field of aviation, requires devices that are small, compact, and efficient, yet extremely robust. Some electrical instruments, such as inductive devices having stators present unique problems in winding the coils thereof which usually are of very fine wire. The manufacture of these devices frequently requires care and specialized techniques. The present invention concerns a method and means for overcoming certain of the difficulties encountered in the winding of stators for electrical devices.

The present invention may be used, for example, in conjunction with a coil winding machine of the general type described in my co-pending patent application Ser. No. 425,527 for Stator Coil Winding Device, now Patent No. 2,936,961, granted May 17, 1960, and is of the general nature of the invention set forth in the co-pending patent application of George I. Roberts, Ser. No. 433,775 for Method and Means of Making Stator Coil End Turns now U.S. Patent No. 2,810,848, granted October 22, 1957. The assignee of both of said co-pending patent applications is the same as the assignee of the instant application.

In the aforementioned patent applications, the stator to be wound is removably fixed within a stator nest which is stationarily positioned within the winding machine. In the U.S. Patent No. 2,810,848 there is shown a preformed insulator having a plurality of lugs thereon which receive the end turns of coils of wire as they are being wound. There is one preformed insulator on each face of the stator. The present invention differs generally from the device disclosed in U.S. Patent No. 2,810,848 in that in the present invention there is shown means not only for forming the end turns of the coils as to symmetry for ease in winding, but also for forming the end turns so that each coil of a series of similar coils will have a direct current resistance equal to that of each of the other similar coils.

Another application Serial No. 506,564, now abandoned, for Severing Device for Coil Form Winding Element, the assignee of which is the same as the assignee of the instant application, relates to the specific means for severing the forming ring and removing the stator from the stator nest 21. The forming ring mentioned in said application is of the same type as that set forth in the present application, and distinguishes from the type of forming ring set forth in the aforementioned application Serial No. 425,527 which is of a diameter smaller than the diameter of its stator and therefore does not require any severing thereof for removal of the completely wound stator from the stator nest.

There are various types of synchro devices. One of these types uses a multiplicity of coils with certain of said coils having like characteristics different from other coils of said device.

For example, in the aforementioned patent applications and in the present invention there is shown a stator to be wound having nine slots therein.

In the present application the completed stator has nine coils of three different general types characterized by the number of turns in each coil and the pitch.

The complete stator of a device referred to herein may have three coils of 12 turns each, three coils of 34 turns each, and three coils of 52 turns each.

The present example refers only to the three coils of 52 turns each. The 52-turn coils are particularly discussed herein because each of the 52-turn coils is wound in the stator slots so that each has a cross-over with one end of each of the remaining two coils of the 52-turn type. The three 52-turn coils shown herein are representative of the problem encountered in multiple similar type coils which have a cross-over of the coils. Since the coils must be wound one at a time, obviously the earliest wound coil would rest flat against the stator and would have end turns which are shorter in length than the coils which are wound later. Consequently, the coils having the longer end turns would naturally have a greater resistance than the coils having the end turns shorter in length, assuming the size of the wire, pitch and other characteristics to be the same. Therefore, it should be clear that in precision instruments where it is necessary to have similar type coils with different end turn conformations yet each having a resistance equal to that of each of the other coils, it is necessary to provide some means for equalizing the resistances of the respective coils.

It is an object of the present invention to provide a novel means for obtaining uniform resistance between coils normally having different end turn conformations but of the same general type employed in an electrical device.

A further object is to provide symmetrical resistance in the coils of multiphase electrical devices.

A further object is to provide a novel means for obtaining substantially uniform resistance of coils of the same general type in an electrical device of the kind set forth.

A further object is to provide a novel means for making the end turns of multiple coils an equal length, so that the direct current resistance of said coils will be substantially uniform.

A further object is to provide novel end turn forming means for stator coil winding wherein the end turns of certain of said coils are preshaped to control the electrical resistance thereof.

Another object of the invention is to provide novel means for controlling resistance of coils of wire as wound in an electrical device by preshaping the end turns of said coils for the purpose of controlling the length of the conductor of said representative coils.

A further object is to provide novel means for balancing the direct current resistance of coils in an end turn forming device by providing forming means for controlling the length of wire.

A further object is to provide novel means for balancing the direct current resistance of coils by preshaping each of said coils to obtain a controlled length, with each of said coils having a shape different from each of said other coils in the same general type or group of coils.

The present invention contemplates end turn forming means to control the length of total wire in various coils to provide symmetrical resistance in multiphase devices. The present invention shows two different ways to control the length of wire in certain coils. One way is to have projections positioned so that the wire of the coil will have to be formed around the projection, the size and position of the projection determining the amount of wire to be added to the coil. The projections are in addition to the forming ring lugs normally used in form winding. The second way is to control the length of each end turn of wire by having the wire carrying surface of certain of the lugs disposed a predetermined distance from the axial center of the stator. Different coils each may have a different general radius so that multiphase devices may employ in coil winding, end turn lugs with surfaces having different radii from a fixed point as determined by the required symmetrical resistance.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and not to be construed as defining the limits of the invention.

In the drawings:

Fig. 1 is an end view of an end turn forming ring positioned over a stator, which stator is carried by a stator nest with means for controlling the length of end turns of wire.

Fig. 2 is a sectional view on line 2—2 of Figure 1 of the adjustable pin means disposed relative to an end turn forming ring.

Fig. 5 is a radial view in the general direction of arrow A5 of Fig. 1 showing a coil as shaped by the adjustable pin means.

Fig. 6 is a view in the general direction of arrow A6 of Fig. 1 somewhat similar to Fig. 5, but of a second coil.

Fig. 7 is a view in the general direction of arrow A7 of Fig. 1 somewhat similar to Fig. 5 but of a coil different from that shown in Figs. 5 or 6.

Figure 3:
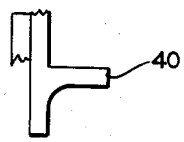
Figs. 3 and 4 are partial side views of two different types of lugs used on the forming ring.

Referring to the drawings and more particularly to Figs. 1 and 2, there is shown a stator 20 carried by a stator nest 21 with an end turn forming ring 22 properly positioned in front of the stator and retained on the stator nest by the annular flange 23 which fits in a complemental groove in the stator nest. The end turn forming ring 22 may be of a type such as disclosed in the aforementioned U.S. application Serial No. 506,564 at Figures 5 and 6 thereof and there may be provided suitable means for cutting or shearing the outer portions of the forming ring 22, as described therein.

In Figs. 1 and 2 there is also shown an adjustable pin means for lengthening the end turns of the coils as required. The adjustable pin means 24, of which there are three suitably disposed on each side of the stator nest in the present application, each have a bearing housing 25 which is attached to the stator nest 21 by ears 26, which ears are secured to the stator nest by screws 27. A screw 27 may be readily removed from each of the bearing housings 25 so that the same may be angularly positioned so as to permit the forming ring 22 with its annular flange 23 to be placed by the operator in position on the stator nest 21. A pin 28 projects through an opening in an end of the bearing housing 25 and it is positioned so that the coil of wire to be wound will have to be wound over the pin, so that the bending of the wire will provide the additional length of wire to increase the resistance of the coil.

The pin 28, in the present instance, is shown integral with a cylindrical body portion 29 and is slidable in the bearing housing. A spring 30 engages one end of the cylindrical body portion and is held within the bearing housing 25 by a cap 31 so that the pin 28 is normally urged toward the stator.

An adjusting knob 32 and pin 28 is secured to the cylinder body 29 so that the knob 32 may be moved with the pin portion thereof riding in the slot 33. The slot 33 is formed in an L shape so that when it is desired to remove the pin 28 from its coil forming position the knob 32 may be moved outwardly from the stator axis and rotated so that it is retained or latched in the slot 33.

In Figs. 5, 6, and 7, the views show an end turn of coils 34, 35, and 36, respectively. Each of said end turns of the coil is shown bent axially in two places so that each of said end turns has substantially an identical bend caused by either a pin or a coil at a cross-over of coils. Fig. 5, coil 34 is deformed by a pair of pins 28 shown in cross section provided by two of the adjusting pin means. Fig. 6, coil 35 has a shape or axial formation substantially similar to that of the end turn of coil 34 shown in Fig. 5, but the coil in Fig. 6 is formed by a pin 28 shown in section and a coil 34 shown in section.

It will be seen that coil 34 is the first wound coil of the series of coils 34, 35, and 36, each of which is a 52-turn coil having a pitch of five slots, with all three coils being wound in a nine slot stator. Fig. 6 is the second coil to be wound of the three coil series presented herein, and there is a cross-over of coils on one of the lugs, namely, lug L–6. To provide the other form portion of the end turn of coil 35, pin 28 is employed and is shown in Fig. 6.

The slots of the stator are numbered counter-clockwise from 1 to 9 inclusive, and the lugs of the end turn forming ring are numbered L–1 to L–9 inclusive in a counter-clockwise manner.

While Figs. 5, 6, and 7 show the end turns on one face of the stator and stator nest, it is to be understood that the end turn of each coil of wire will be substantially identical on the opposite face of the stator and stator nest as the coil is formed on the end turn forming rings.

After the end turn of coil 34 is formed as shown in Fig. 5, the pins 28 of the adjustable pin means are removed by urging the knob 32 of two of the pin means outwardly from the stator axis and rotating same in the L-shaped slots where the pin remains out of the way.

Both of the pins 28 shown in Fig. 5 are now clear of the winding. After the stator is rotated and properly indexed in the automatic winding machine, the second coil, namely coil 35, may be wound. Coil 35 is wound in slots 6 and 1, as shown, with the coil 34 being used for forming one bend at one side of the end turn of coil 35, while a pin 28 is used to form the other bend at the other side of the end turn of the coil 35. Pin 28 is adjusted outwardly from the stator axis to clear winding 35. After the stator and stator nest are suitably indexed for winding, the third 52-turn coil, or coil 36, results in the configuration as shown in Fig. 7. It will be noted that in Fig. 7 the bent or axially formed areas of the coil 36 are shaped by cross-overs of the coils 35 and 34, with coil 36 being wound in slots 9 and 4.

From Fig. 1 it is clear that there are three cross-over points for the three coils.

Figure 4:
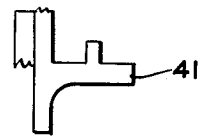

In Figs. 3 and 4 there are shown side views of the lugs which are part of one type of end turn forming ring. The side view of the lug type 40 shown in Fig. 3 is the side view of the lugs L–3, L–6, and L–9, which are used at cross-over points. The side view of lug type 41 shown in Fig. 4 is used for lugs L–1, L–2, L–4, L–5, L–7 and L–8. The portion of the last mentioned lugs which is to the right of the vertically extending portion of the lug type 41 shown in Figure 4 may provide an outer wire supporting surface on which may be wound another set of one hundred and twenty degree pitch coils which have not been shown as the same are considered unnecessary to an understanding of the present invention.

From the foregoing description, it will be seen that the end turns on both ends of each coil of the series of similar coils not only are shaped by the end turn forming means so that the end turns of each coil are clear, radially, of the stator slots, but also are shaped axially by additional means, such as the pins 28, or a coil section, where necessary, so that all of the end turns of the same type coil have substantially the same axial conformation provided by either pin means, coil sections, or a combination of pin means and a coil section. Accordingly, it will be seen that the length of conductor of each of the same type coils will be substantially identical resulting in a substantially identical resistance for each of the coils of the series. Consequently, the physical dimensions of the coils being symmetrical, the electrical dimensions will be symmetrical accordingly.

After the coil winding operations have been completed the pin 28 may be removed from its coil forming position and the knob 32 latched in the slot 33. Thereafter the outer portions of the forming ring 22 may be severed from the several lugs by the cutting or shearing means, as described in the copending U.S. application Serial No. 506,564, whereupon the several wire carrying lugs may be manually removed from the wound coils by the operator and the outer portions of the ring 22 removed upon angular positioning of the bearing housing 25 as heretofore explained.

Figure 8:
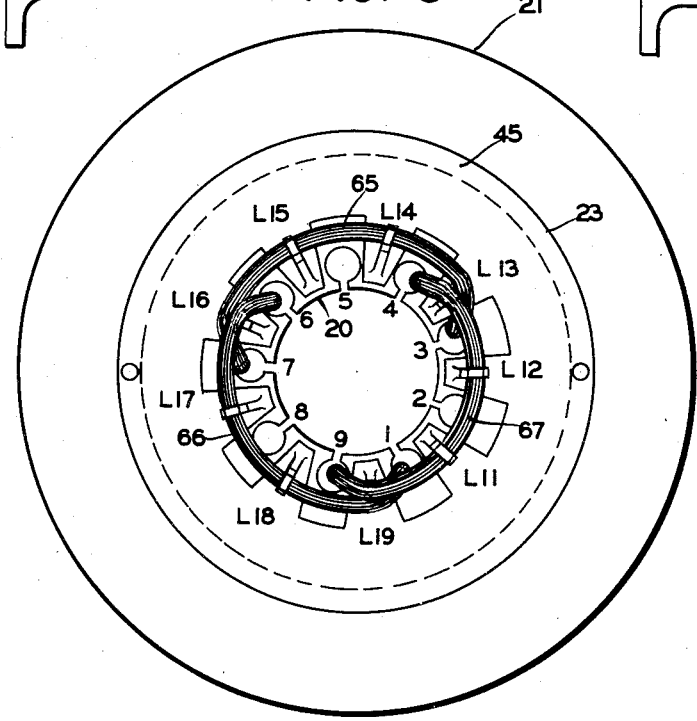
Fig. 8 is a modification of the end turn forming ring showing a second way of providing symmetrical resistance by controlling the length of wire of the end turns.
Figure 9:
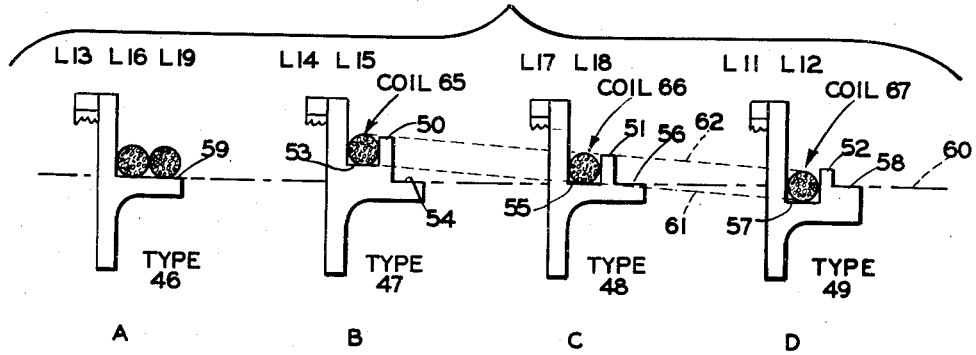
Fig. 9 shows 4 different side views, namely A, B, C, and D, of four different type lugs used on the modified end turn forming ring.

An alternate means of providing symmetrical direct current resistance in multiphase devices, such as synchros, motors, solenoids, magnetic amplifiers, and the like, is shown in Figs. 8 and 9. The last mentioned form of the invention of Figures 8 and 9 is specifically disclosed and claimed in a copending divisional U.S. application Serial No. 27,136, filed May 5, 1960 by George I. Roberts and assigned to the Bendix Corporation.

In Fig. 8 the stator nest 21 is shown having a stator 20 positioned therein similar to that shown in Figs. 1 and 2. An end turn forming ring 45 is of the general nature of the forming ring 22 shown in Figs. 1 and 2, in that the forming ring 45 has an annular flange 23, which is like that shown in Figs. 1 and 2, and nine lugs. The forming ring 45 like the forming ring 22 may be held to the stator nest 21 by push fitting the annular flange 23 thereof into a complemental groove provided in the stator nest 21 and keying the same in a proper radial position. However, the lugs in Figs. 8 and 9, while they are for the purpose of receiving the end turns of wire of the coils for placing the wire in the proper slots and keeping the wire clear of the intervening slots, have an additional function.

As shown in Fig. 9 there are four views, namely, A, B, C, and D. The slots in Fig. 8 are numbered from 1 to 9 in a counter-clockwise direction, and the forming ring lugs are numbered L–11 to L–19 inclusive. The lugs and slots shown in Fig. 8 are in the same respective position as the lugs and slots shown in relation to Fig. 1. However, it will be seen that the four different side views shown in Fig. 9, which relate to Fig. 8, are different from the two side views 3 and 4, which relate to Fig. 1. Fig. 3 and Fig. 9A appear to be generally similar, but the lug shown in Fig. 9A has its wire supporting surface at a predetermined radius from the center of the stator for the purpose of controlling the length of conductor in the end turn to provide electrical symmetry in the coils, whereas the wire supporting surface of a device as shown in Fig. 3 is designed primarily for facilitating automatic winding wherein the coils are wound in stator slots and intervening stator slots must be kept clear for subsequent coils to be wound.

In Fig. 9 the views A, B, C and D have the four lugs type 46, 47, 48 and 49. Lugs in views 9B, 9C and 9D each have a vertical portion 50, 51, and 52, respectively. On either side of the projections 50, 51, and 52 there are wire supporting surfaces. Fig. 9B has an inner wire supporting surface 53 and an outer wire supporting surface 54. Fig. 9C has an inner wire supporting surface 55 and an outer wire supporting surface 56. Fig. 9D has an inner wire supporting surface 57 and an outer wire supporting surface 58. The wire supporting surface 59 of Fig. 9A is shown on the same plane as the wire supporting surface 54 of Fig. 9B, 56 of Fig. 9C, and 58 of Fig. 9D, all of said surfaces being shown in the same plane by the reference dash-dot line 60, which is drawn through a given radius of all four views of Fig. 9. The outer wire supporting surfaces 54, 56 and 58 may provide surfaces on which other sets of coils may be wound and which coils have not been shown, as the same are considered unnecessary to an understanding of the present invention.

The inner wire supporting surfaces 53 of Fig. 9B, 55 of Fig. 9C and 57 of Fig. 9D, are all shown at different levels relative to the plane represented by the reference dash-dot line 60. Surface 53 is above the reference line 60, surface 55 is on the reference line 60, surface 57 is below the reference line 60, and each surface has a different radius from the axial center of the stator. Dotted lines 61 and 62 are drawn across the bottom and top surfaces, respectively, of the coils carried by the inner wire supporting surfaces to stress the different levels of the wire carrying surface as shown in Fig. 9. Actually, the radius of the wire carrying surface, when referred to herein, means the distance from the axial center of the stator to the wire carrying surface, such as 53. It will be seen in Fig. 8 that lugs L–14 and L–15 have the wire carrying surfaces which describe an arc, which is greater than the arc defined by inner wire carrying surfaces 55 of lugs L–17 and L–18. The wire carrying surface 57 of lugs L–11 and L–12 would describe an arc having shorter or smaller radius than either the radius provided by the inner wire supporting surfaces shown in Figs. 9B or 9C.

Coil 65 is wound in slots 3 and 7. Coil 66 is wound in slots 1 and 6, while coil 67 is wound in slots 9 and 4, as shown. Lug L–16 is a cross-over point for coils 65 and 66. Lug L–13 is a cross-over point for coils 65 and 67. It will be seen that the coil 65 which is wound first of the three coil series lays flat against the forming ring and, consequently, will require lugs, such as L–14 and L–15 which have the wire carrying surfaces 53 which surfaces have a radius from the center of the stator, which is greater than that of any of the wire carrying surfaces of any other lugs.

After coil 65 is wound, the coil 66 is then wound on the stator. In this case since a portion of the coil 66 could be wound over lug L–16 and also be wound over a section of coil 65, which produces an axial bend or formation, coil 66 will require lugs which have an inner wire carrying surface with a radius shorter than that required for coil 65.

Coil 67 which is the third of the three coils in the series to be wound will rest on a portion of both coils 65 and 66. Since this condition is quite similar to that shown in Fig. 7, it will be obvious that the radius of the wire carrying surface 57 of lugs L–11 and L–12 will be shorter than that of the inner wire carrying surface of lugs shown in Figs. 9B and 9C.

From the foregoing it will be seen that the lug shown in Fig. 9A, which is used at the cross-over point, has the carrying surface 59 at a uniform predetermined radius from the axial center of the stator; while the end turns of each of the coils 65, 66, and 67 are formed on lugs which have wire carrying surfaces defining the distance of the wire carrying surfaces from the axial center of the stator.

From the foregoing, it will be seen that the direct current resistance of the three coils is balanced by two different means, namely, the means shown in Fig. 1 and the means shown in Fig. 8. The means shown in Fig. 1 primarily shapes, distorts or bends the wire axially in addition to the radial forming of the end turns by the shape and position of the lugs; while the means shown in Fig. 8 spaces the wire carrying surfaces of the lugs for the respective coils, so that the general arc of the various coils each has a radius which is different from the radius of the other end turns of the coils in the series.

The present invention is a means for minimizing the direct current unbalance effects on residual, fundamental and harmonic voltages in control synchro circuits. The invention minimizes or effectively eliminates the direct current resistance unbalance effects on electrical error in any synchro circuit.

Although but two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A coil forming means to provide a symmetrical resistance in a multi-coil electrical device of a type including a stator nest for receiving a stator member, said stator member having a plurality of slots, said slots including pairs of slots arranged in consecutive relation for receiving wire to be wound in the slots, and a forming ring member adapted to be mounted at one end of the stator nest and having lugs to confine the wire of each of the coils as the coils are wound in the stator slots; the improvement comprising a plurality of projecting members for cooperating with end turns of the wire, means for slideably mounting the projecting members on an end face of the stator nest, and operator-operative means for slideably positioning each of the projecting members selectively into cooperative relation with the wire end turns and immediately between a pair of said consecutive slots so that wire of a coil wound in one of the slots of the pair of consecutive slots may be formed around the projecting wire end turn member, each of the projecting members being of a predetermined size such as to cooperate with the aforesaid lugs in effecting a predeterminable total length of wire in a wound coil and thereby effect symmetrical resistance in the coils of the electrical device.

2. A coil forming means to provide symmetrical resistance in a multi-coil electrical device of a type including a stator nest for receiving a stator member, said stator member having a plurality of slots, said slots including pairs of slots arranged in consecutive relation for receiving wire to be wound in the slots, and coil forming means affixed to the stator nest and adapted to be positioned adjacent opposed faces of the stator member, said coil forming means having portions for alignment with the stator slots and lugs for carrying the wire of the coils formed therein; the improvement comprising adjustable pin means for cooperating with end turns of the wire, bearing means for slideably mounting each of the pin means on a face of the startor nest, and means for selectively positioning the pin means into cooperative relation with the end turns of the wire and immediately between a pair of said consecutive slots so that wire of a coil wound in one of the slots of the pair of consecutive slots may be turned at the face of the stator over the wire end turn pin means, and the wire end turn pin means being of a predetermined size and in a predetermined position relative to the slots so as to cooperate with the aforesaid lugs to cause a predetermined length of the wire of the wound coil such as to provide symmetrical resistance in the coils of the electrical device.

3. A coil forming means to provide symmetrical resistance in a multi-coil electrical device of a type including a stator nest for receiving a stator member, said stator member having slots arranged in consecutive relation for receiving wire to be wound in the slots, and a forming ring member adapted to be mounted at one end of the stator nest and having lugs to confine the wire of each of the coils as the coils are wound in the stator slots; the improvement comprising a plurality of wire end turn members, means for mounting the wire end turn members on an end face of the stator nest, said wire end turn members projecting from said mounting means in a position immediately between the consecutive stator slots so that wire of at least one of the coils wound in said slots may be turned at the face of the stator over one of the wire end turn members, and each of the wire end turn members being so dimensioned and arranged as to cooperate with the aforesaid lugs to effect a total length of the wire of the wound coils such as to provide symmetrical resistance in the coils of the electrical device.

4. A coil forming means to provide symmetrical resistance in a multi-coil electrical device of a type including a stator nest for receiving a stator member, said stator member having slots arranged in successive relation for receiving wire to be wound in the slots, and coil forming means affixed to the stator nest and adapted to be positioned adjacent opposed faces of the stator member, said coil forming means having portions for alignment with the stator slots and lugs for carrying the wire of the coils formed therein; the improvement comprising projecting wire end turn means, the wire end turn means being mounted on a face of the stator nest in a position between the successive stator slots so that wire of at least one of the coils wound in said slots may be turned at the face of the stator over the projecting wire end turn means, and the wire end turn means being so dimensioned and arranged in relation to the slots as to cooperate with the aforesaid lugs to effect a total length of the wire of the wound coils such as to provide symmetrical resistance in the coils of the electrical device.

References Cited in the file of this patent

UNITED STATES PATENTS

| | | |
|---|---|---|
| 2,624,518 | Scofield et al. | Jan. 6, 1953 |
| 2,647,696 | Brunand | Aug. 4, 1953 |